I. Merritt,

Knife.

No. 2,520. Reissued Mar. 19, 1867.

Witnesses:
Thos. R. Roach
Thos. A. Howes

Inventor:
Jno. Merritt

United States Patent Office.

IRA MERRITT, OF ABINGTON, MASSACHUSETTS, ASSIGNEE BY MESNE ASSIGNMENTS OF HIMSELF.

*Letters Patent No.* 24,354, *dated June* 7, 1859; *reissue No.* 2,520, *dated March* 19, 1867.

IMPROVEMENT IN KNIVES.

The Schedule referred to in these Letters Patent and making part of the same.

TO ALL WHOM IT MAY CONCERN:

Be it known that I, IRA MERRITT, of Abington, in the county of Plymouth, and State of Massachusetts, have invented a new and improved Extensible-Blade Knife, more particularly adapted to the use of boot and shoemakers, of which the following is a full, clear, and exact description, reference being had to the accompanying drawings making part of this specification.

The invention provides for inserting the whole or a considerable part of the blade within the handle or stock in such a manner that while it is held firmly in any desired position for cutting, it may be extended out from the handle when necessary or as the blade wears away. Persons engaged in cutting out stock in boot and shoe manufactories, and the shoemakers themselves, find a great inconvenience from the rapid wearing away of the cutting knife which they employ, as the nature of the stock on which they operate requires a frequent sharpening of the knife, so that no sooner has the operative become accustomed to a blade of a certain length than he finds it wearing away under his use, soon requiring to be replaced by another of considerably greater length than the one he has just resigned. These frequent changes interfere materially with the neat and accurate manipulation which an artisan acquires by the continued use of a tool to which his hand has become accustomed. The object of my present invention is to obviate this difficulty, and to produce a knife for the above and similar purposes, the blade of which, as it is worn away by use, may be drawn out further from the handle, and thus be kept at such a uniform length as may suit the convenience of the person using it, and in which the blade when worn away may be easily replaced by another of a similar form, or by one of a different form suited to different kinds of work. This knife consists of a hollow handle or blade holder provided with clamps or nippers for grasping and holding the blade firmly in any desired position, and also of a blade which may be drawn out more or less from the handle and firmly held in different positions as the blade wears down, or to suit the requirements of the person using the tool.

Figure 1:
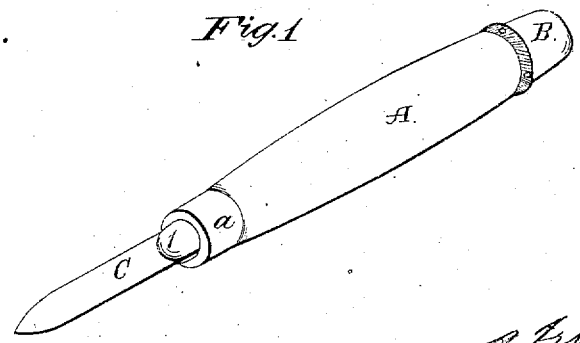

Figure 1 is a view of the knife with the blade partially extended.

Figure 2:
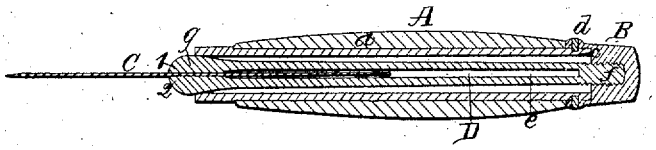

Figure 2, a longitudinal section through the same.

Figure 3:
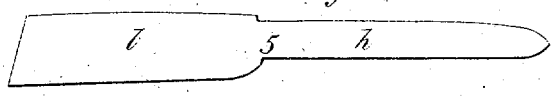

Figure 3, detail to be referred to hereafter.

In the said drawings A is a handle of wood in which is inserted longitudinally a metal tube, *a*, one end of which may have cut round its outer surface a groove, *c*, in which fit pins *d*, passing through the edge of a metal nut, B, on the end of the handle, and holding the nut in place but permitting it to be turned round freely in either direction. Within the tube *a* is placed a long bifurcated rod of metal, D, the bifurcation *e* extending nearly the whole of its length to receive the blade C, the two parts of the rod thus forming a pair of clamps or nippers. This clamp-rod, D, has formed on its upper end a screw, *f*, which engages with the nut B, so that by turning the nut in one direction the piece D is thrust out further from the opposite end of the tube *a*, while by turning the nut in the other direction the piece is retracted. The end of the piece D opposite to the screw, or that which may be termed the lower or outer end, is somewhat enlarged, forming a bulb, *g*, made of such a diameter that when the blade is inserted in the slit *e*, the jaws 1 and 2 of the nippers shall be somewhat wider than the bore of the tube *a*. If now the piece D be retracted by turning the nut B, the inclined faces of the bulb *g* will be drawn against the edge of the tube *a*, and the nippers will be pressed tightly on the blade, securing it firmly in any position the operator may wish. It only requires that the nut be turned in the opposite direction to release the blade, when it can either be drawn out further from the handle or be removed to be replaced by another; or, if required, the blade may be pushed back into the handle occupying the slit *e*, when the jaws 1 and 2 may be closed over its point, and the knife can be safely carried about the person. The blade is to be formed generally of a piece of steel of even or about even width, and tempered the whole or nearly the whole of its length, so that it may be adjusted and held in different positions in the handle, and so that portions which serve at one time as the tang of the blade may, as the blade wears away, become the cutting part. It may have its opposite edges ground down to or approximating to a cutting edge, or one edge alone may be ground down or sharpened, or the blade may be of uniform thickness entirely across it, and have a spear point formed upon it as seen at fig. 1. For some kinds of work a blade shaped as shown in fig. 3 may be preferred. It will readily be seen that such a blade may be adapted to the same handle, the portion, *h*, or tang of the knife being made to fit in the slit *e*, and this part may be so formed, if required, that when the broad part, *l*, of the blade has been worn away the tang portion itself may be converted into a blade similar to the blade C, by merely breaking off the portion *l* at the shoulder 5.

I claim the knife handle herein described provided with means for clamping the blade, and for allowing the cutting edge or point to be adjusted with respect to the handle substantially as set forth.

I also claim adjustable blades so made as to be fixed and held in different positions in the handle, substantially as set forth.

IRA MERRITT.

Witnesses:
SYLVANUS NASH,
SYLVANUS McKENNEY.